Aug. 17, 1943.　　　　P. C. ELY　　　　2,326,843
APPARATUS FOR THE CONTINUOUS GALVANIZING OF PIPE AND THE LIKE
Original Filed April 7, 1941　　7 Sheets-Sheet 1
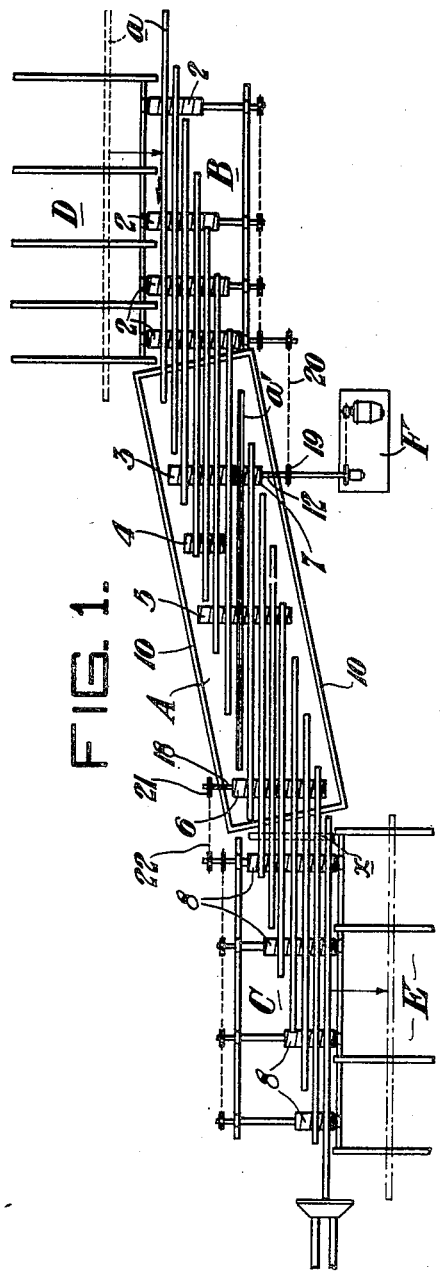
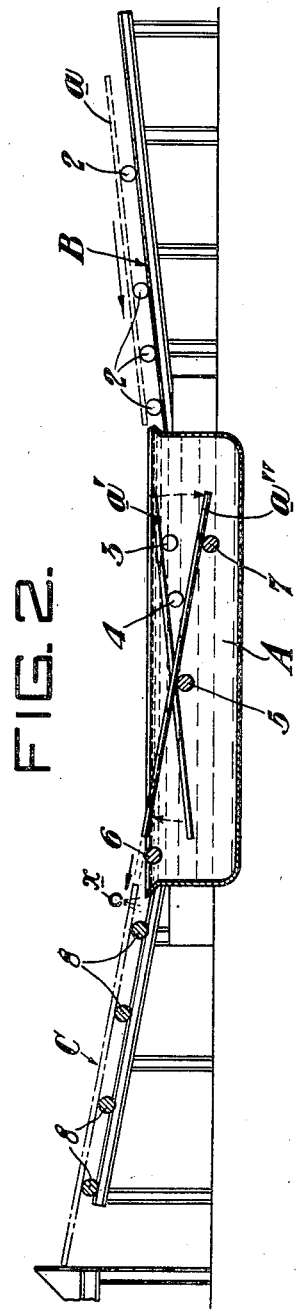
Inventor:
PAUL C. ELY,
by: John E. Jackson
his Attorney

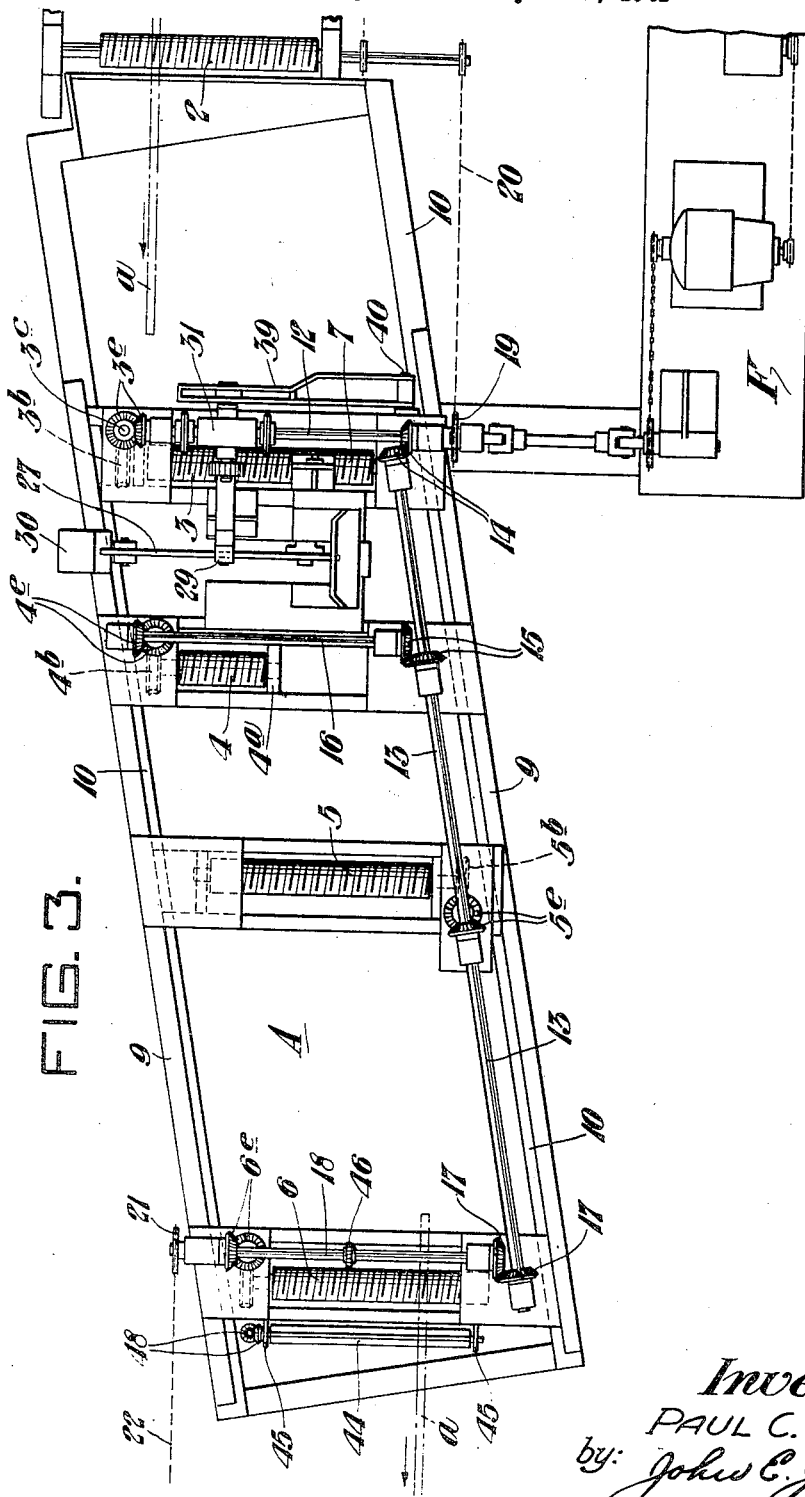

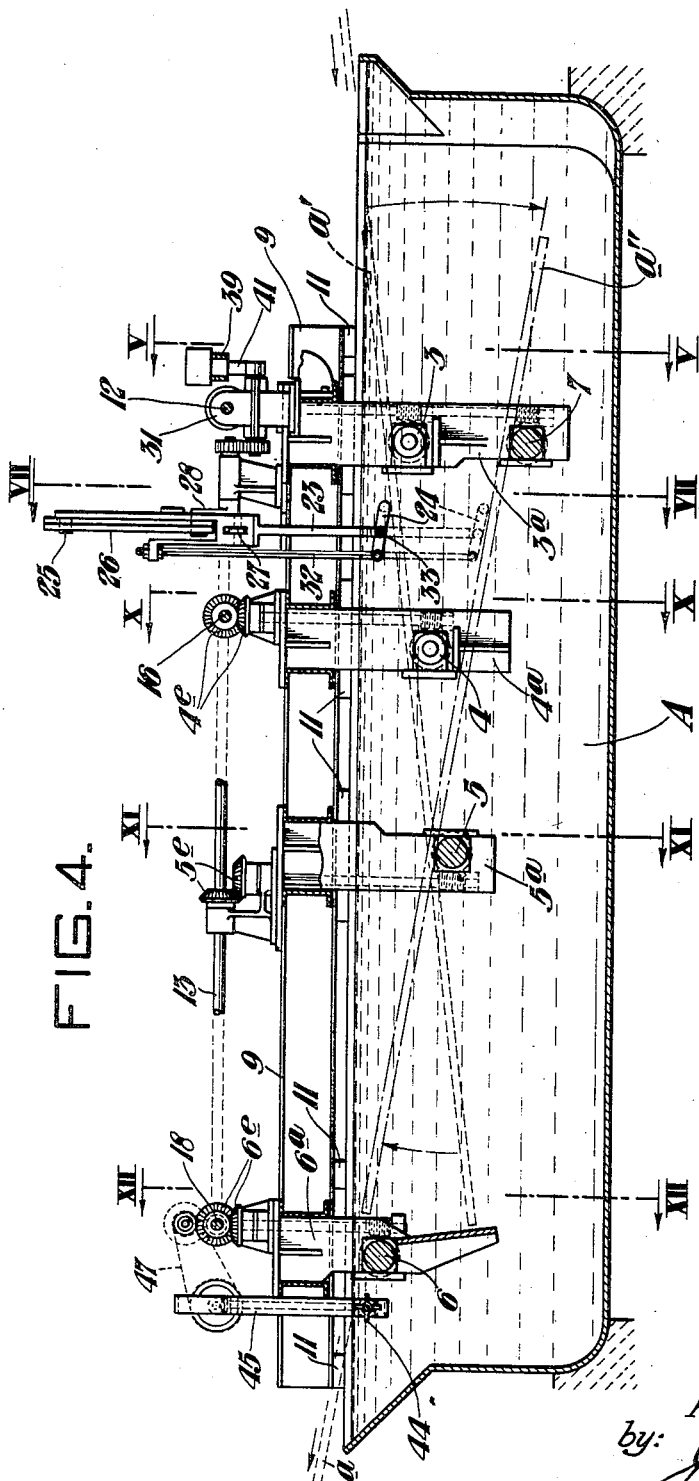

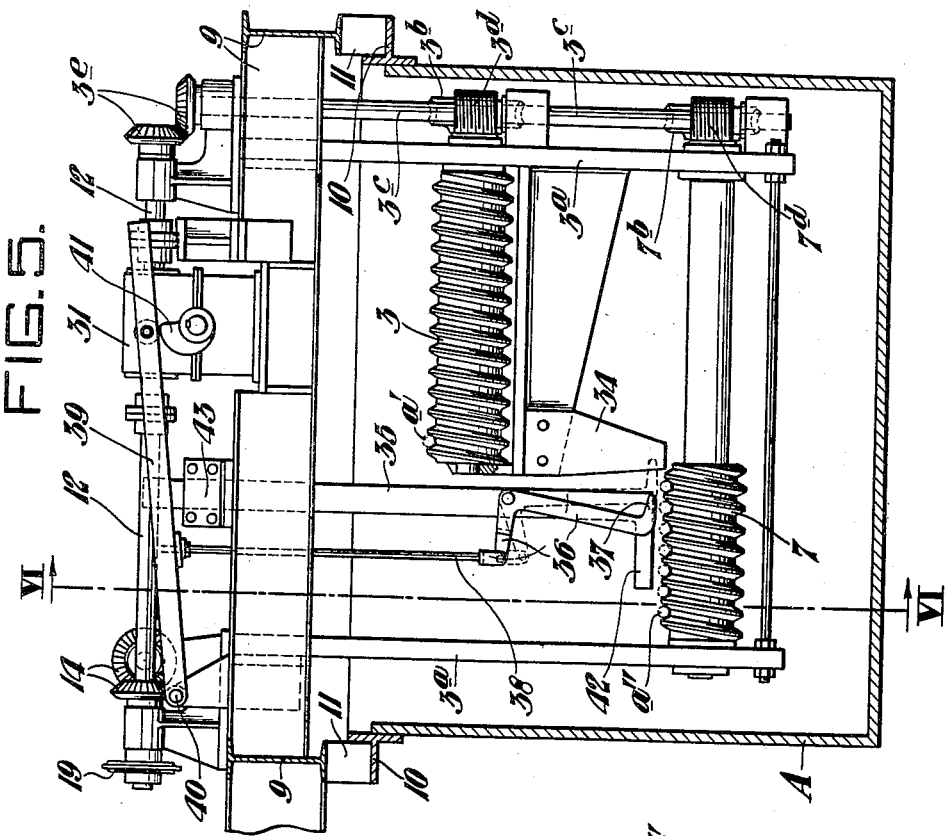

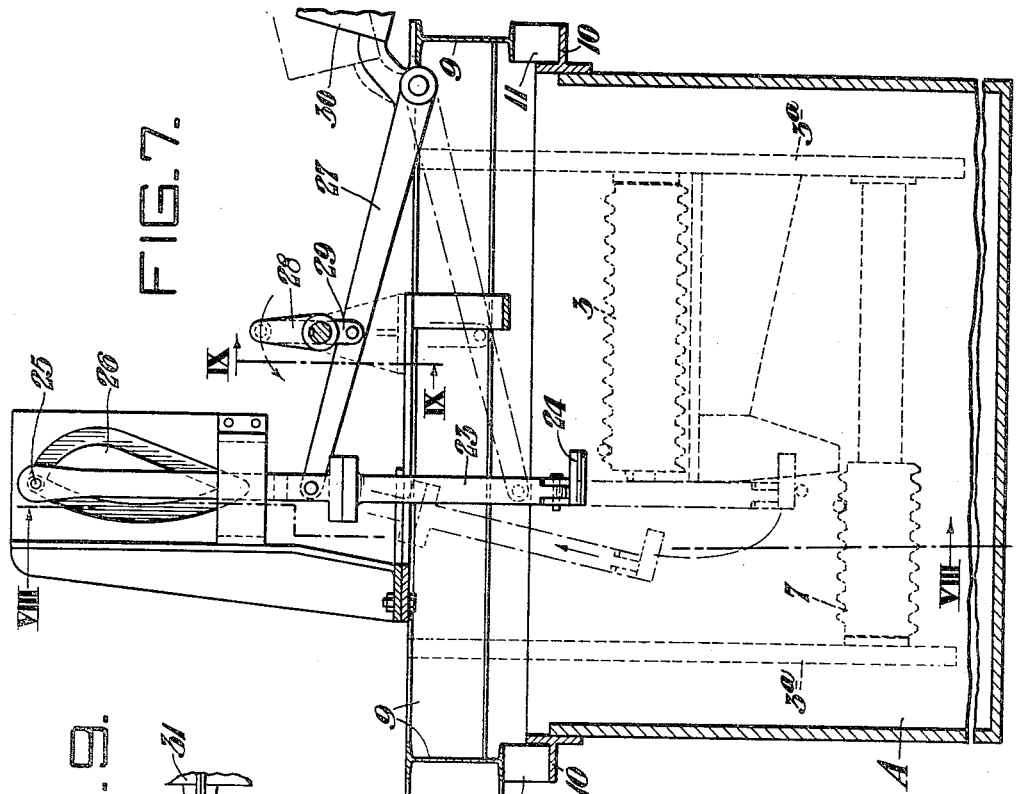

Aug. 17, 1943.  P. C. ELY  2,326,843
APPARATUS FOR THE CONTINUOUS GALVANIZING OF PIPE AND THE LIKE
Original Filed April 7, 1941   7 Sheets-Sheet 6

Inventor:
PAUL C. ELY,
by: John E. Jackson
his Attorney

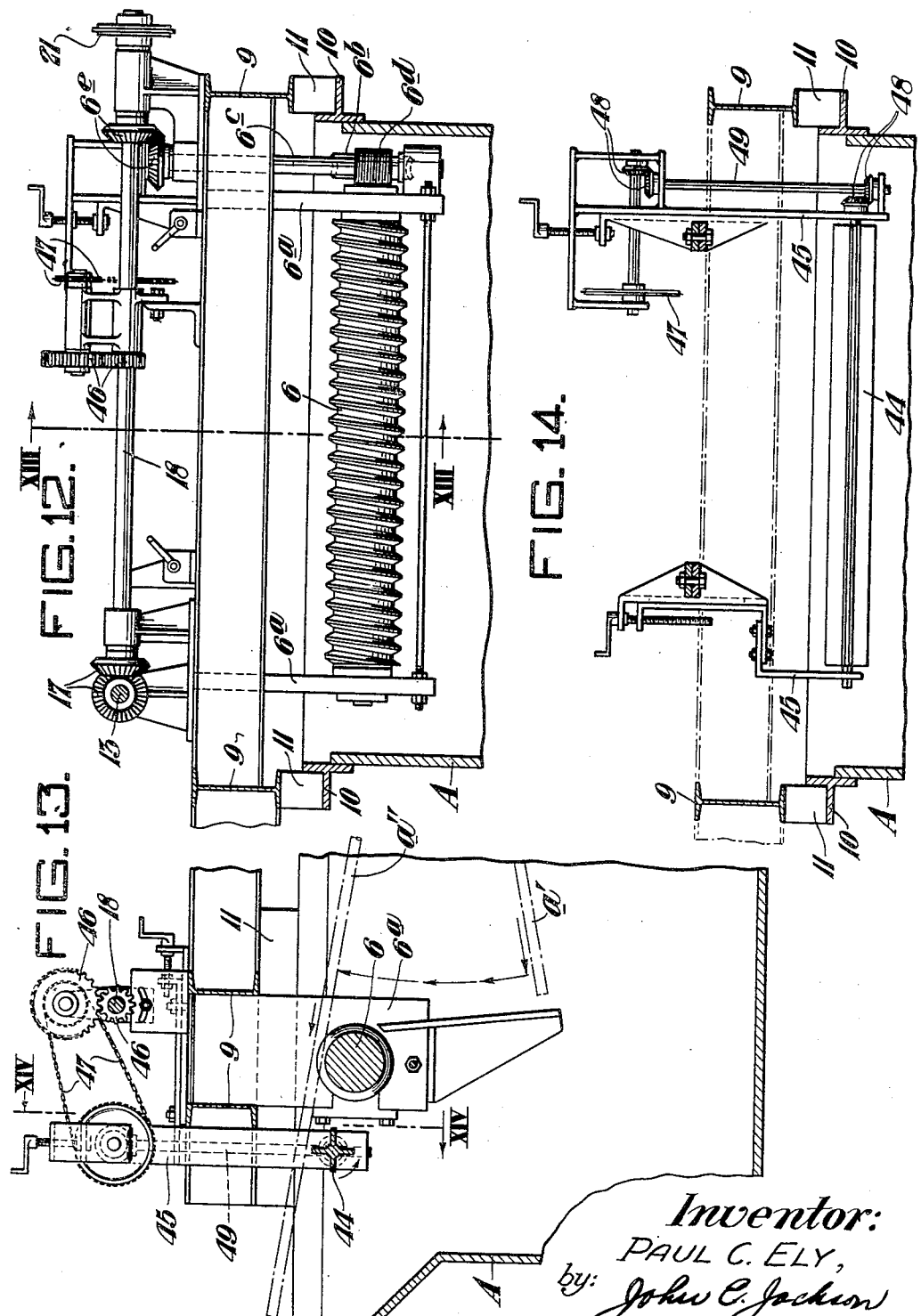

Patented Aug. 17, 1943

2,326,843

UNITED STATES PATENT OFFICE 2,326,843

APPARATUS FOR THE CONTINUOUS GALVANIZING OF PIPE AND THE LIKE

Paul C. Ely, Lorain, Ohio, assignor to National Tube Company, a corporation of New Jersey Original application April 7, 1941, Serial No. 387,332. Divided and this application March 17, 1942, Serial No. 435,100

11 Claims. (Cl. 91—12.7)

This invention relates to improvements in apparatus for the continuous coating treatment of hollow elongate articles, such as the hot galvanizing of metal pipes and the like, this application being a division of my pending application, Serial No. 387,332, filed April 7, 1941.

Generally, pipes and the like have been hot galvanized heretofore by one of two methods, i. e., the batch process, whereby a bundle of pipes is immersed in the molten spelter and then withdrawn in said bundle; or by the wiping process, wherein individual pipes or articles are withdrawn from the bath and the adhering coating is wiped by air or steam wipes.

The batch process is undesirable due to the uneven coating caused by the zones of contact and adherence between the pipes of the bundle, and because of the bubbling and splashing upon immersion due to the size of the bundle and the entrapped air in the pipes. The latter causes the formation of considerable zinc oxide as scum on the surface of the galvanizing bath which is both uneconomical and inconvenient, as said scum must be removed or otherwise prevented from contact with the pipes during the coating process. Also, such splashing is wasteful, messy and hazardous to the workmen.

In the wiping method employing individual withdrawal of the pipes or the like, the speed of withdrawal presents a serious objection to the process, the same causing large quantities of spelter to adhere and be drawn out of the bath on the pipes, producing an uneven deposit or coating. Even though air jets and wipes are employed to remove this excess spelter immediately after the pipes leave the bath, the results are not uniform and these operations oxidize the larger portion of the excess spelter returned to the bath, which latter feature is undesirable, as before noted. Further, the inside coating produced by such method is not uniform and is frequently very rough. Also, the rate of production of the said process is much lower than that of the batch process.

Generally, the bath temperatures employed in such prior practices are from 870° F. to 900° F., which permits the formation of large amounts of zinc oxide and dross which is highly objectionable and wasteful. The continued formation of large amouts of such matter necessitates frequent removal thereof to prevent contact of the pipes or articles therewith.

The present invention is designed to at least attain the quantity and speed of production of the prior practices without the difficulties and undesirable features thereof, and to provide a greatly improved coated product, possessing a high degree of uniformity and enhanced appearance.

My invention contemplates apparatus for providing a combined forward and lateral advancement of the pipes or articles in spaced series arrangement in relation to and through a coating bath, so as to obtain a proper immersion period in the bath, and provides for the separate or spaced withdrawal of the coated pipes or articles in regular succession to thereby attain and maintain a high rate of production.

The invention further has in view to provide apparatus for imparting a continuous individual motion to the pipes or articles upon their removal from the bath so as to uniformly distribute the coating, both with respect to the interior and exterior surfaces thereof.

I have found that the said series advancement of the pipes or articles through the bath affords a sufficient time interval for each pipe or article to enable the easy endwise introduction thereof into the bath, thereby avoiding bubbling and the formation of zinc oxide or scum, and that it also affords sufficient time on the exit side of the bath for proper and controlled setting of the coating without the necessity of multiple wipes and the like. Further, that by giving proper time to the setting of the uniform coating in air, I am enabled to produce a galvanize coating having an exceptionally attractive luster which is retained for long periods of time.

By the use of my invention, I am enabled to operate at a sufficiently reduced temperature to prevent excessive oxide formation, the temperature of the zinc spelter being substantially from 840° F. to 860° F.

A most important feature of the invention resides in the fact that the foregoing objects are accomplished without limiting production, and that the present invention provides an apparatus having a high production rate and producing an improved and uniform product.

Additional objects and advantages will become apparent from the following description taken in connection with the accompanying drawings, wherein:

Fig. 1 is a diagrammatic plan view of an apparatus employed in the practice of my invention, illustrating the path of travel of the pipes or other articles in relation to the coating bath;

Fig. 2 is a side elevation thereof, partly in section, showing the entrance and exit paths of the pipes to and from the coating bath;

Fig. 3 is an enlarged plan view of the coating tank;

Fig. 4 is a longitudinal section through the coating tank of Fig. 3;

Fig. 5 is an enlarged sectional view taken on the line V—V of Fig. 4, showing the latch means for maintaining the pipes submerged for a portion of their travel;

Fig. 6 is a section taken on the line VI—VI of Fig. 5;

Fig. 7 is an enlarged sectional view taken on the line VII—VII of Fig. 4, showing the pipe sinker means;

Fig. 8 is a section taken on the line VIII—VIII of Fig. 7;

Fig. 9 is a detail view taken on the line IX—IX of Fig. 7, showing the crank drive for said sinker means;

Figs. 10, 11 and 12 are enlarged cross-sections taken on the lines X—X, XI—XI, and XII—XII of Fig. 4, respectively, showing the screw conveyors;

Fig. 13 is a sectional view taken on the line XIII—XIII of Fig. 12, showing the location of the agitator for the coating bath; and Fig. 14 is a sectional view taken on the line XIV—XIV of Fig. 13.

Figure 10:
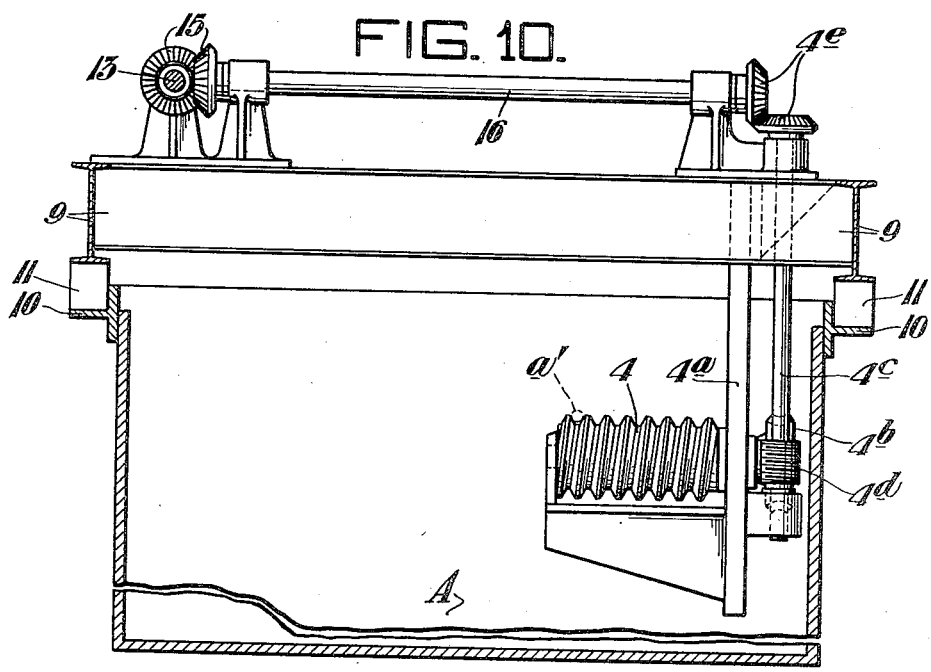
Figure 11:
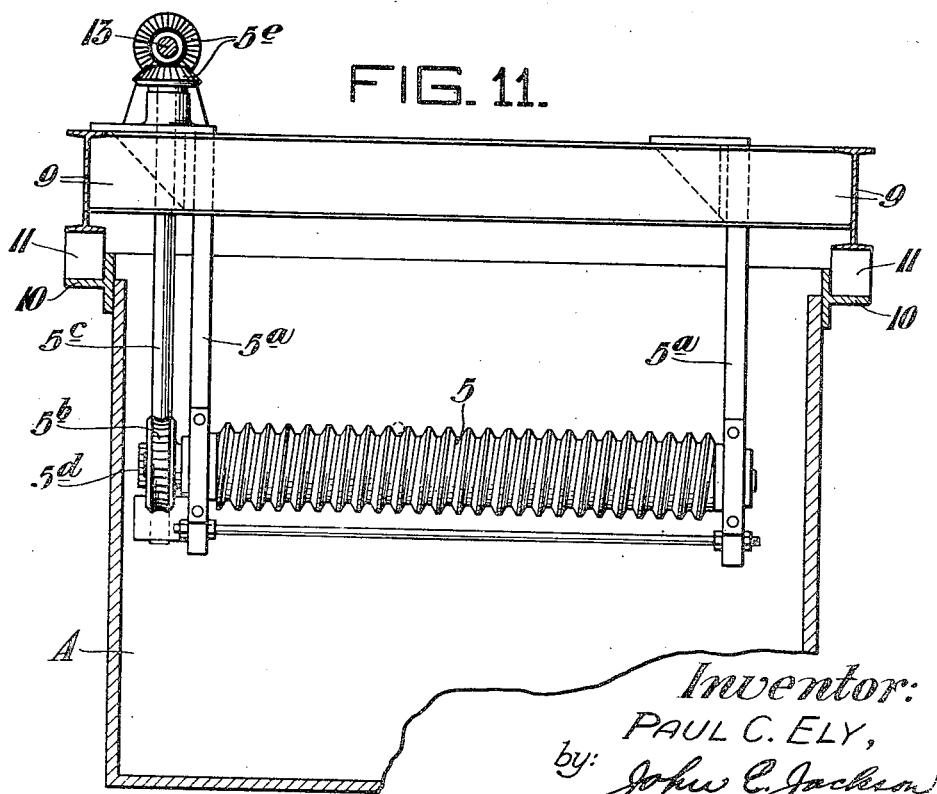

In the drawings, I have shown a preferred form of my invention as employed in the hot galvanizing of metal pipes and the like. The operation thereof will be more readily understood by reference first to Figs. 1 and 2, wherein A designates generally a tank or bath containing the coating solution, such as hot zinc spelter, positioned intermediate a charging table B and a delivery table C. The preheated and fluxed pipes a are fed from a conveyor means D lengthwise upon a series of horizontal transverse screw or threaded conveyor rolls 2 disposed in downwardly inclined alignment toward the tank or bath A, said rolls being driven in synchronism and having their threads in alignment in a direction toward the tank, for supporting and conveying the pipes in parallel relation toward and downwardly into said tank or bath. The feed from the means D may be regulated in the usual manner to deliver a pipe to the screw conveyor rolls 2 for each revolution thereof, whereby said pipes are received between and carried by the threads of said rolls in spaced relation as shown.

The action of the threads of the rotating screw conveyor rolls will advance the pipes a in a longitudinal forward and downward direction, and at the same time will convey the said pipes laterally in the direction of advance of the threads of said conveyors. Hence, by placing the usual rectangular tank A in skewed position, as shown in Fig. 1, a considerable number of the pipes a may be advanced in parallelism into, through and out of the tank in diagonal relation thereto.

The tank A is provided with similar screw or threaded horizontal conveyor rolls 3, 4 and 5, extending in a direction transversely of the tank and being disposed to receive and support the pipes a in their downward forward inclined travel by the charging table rolls 2, the rolls 3, 4 and 5 being submerged in the spelter of the bath.

Conveyor rolls 3, 4 and 5 are driven in synchronism with the rolls 2 so as to maintain the pipes a in parallel relation, all of said rolls being driven at a proper speed to enter the pipes into the bath without appreciable disturbance of the latter, the pipes entering end first in a downward direction, permitting the complete escape of air therefrom through their elevated rear end portions.

The angle of inclination of the pipes and the length of roll conveyor 3 are so designed and related that as each pipe is substantially submerged in the bath, the said pipe passes laterally beyond the roll 3 and is momentarily supported only by the engagement of its forward portion upon roll 5, the said position of the pipe being indicated at a' in Figs. 1, 2 and 4.

As each pipe or article reaches the position a', the rear portion thereof is engaged by and pushed downwardly in the bath by a suitable sinker device, hereinafter described, said pipe pivoting on the roller 5 to thereby reverse the inclination of the pipe, elevating the forward end thereof substantially to the surface of the bath in position to engage and be supported upon a conveyor screw or threaded roll 6, as indicated at a'' in Figs. 2 and 4, the lowered rear end portion of said pipe engaging and being supported by an additional conveyor roll 7 at a lower elevation in the tank. The successive pipes are then conveyed by rolls 5, 6 and 7 onto similar threaded conveyor rolls 8 of delivery table C, and finally laterally delivered thereby onto a receiving conveyor means E.

The series of conveyor screws or threaded rolls employed are driven at the same rate of speed and are synchronized so that the thread and pipe engagement will maintain the pipes in substantial parallelism during their travel. Due to the compound linear motion, i. e., simultaneous forward and lateral travel of the pipes, I am enabled to maintain the pipes in contact with the coating material or spelter for the proper time interval, and simultaneously treat a series of pipes at a proper speed for adequate coating treatment with high efficiency from the standpoint of production.

It will be noted that by reversing the inclination of each pipe at the time of its complete submergence in the bath to bring the forward end thereof to the surface of the bath, and then withdrawing the pipes, all surface portions thereof throughout the length of said pipes will have been subjected to the spelter for a substantially equal time interval, and hence the coating deposits on all portions of the pipes will be uniform, within the limitations of uniform fluxing, temperature, etc. In any event, the process insures a uniform contact interval for the pipes with the coating material throughout their lengths and travel.

A further and important step in the practice of my invention consists in continuously rotating the pipes on their longitudinal axes during the coating treatment, whereby a high degree of uniformity is obtained for the applied coating. Such rotation is accomplished by the contact of the pipes with the faces of the threads of the rotating conveyor rolls, which threads are preferably of V-form having flattened roots and apices, as shown in the drawings.

As the pipes emerge upwardly and endwise through the surface of the coating bath, the said rotation functions to evenly discard the excess spelter from the external surfaces of the pipes and likewise to provide uniform return flow of the excess spelter along the internal surfaces thereof. This rotating upward endwise emergence of the pipes from the bath appears to have the effect of gently smoothing or finishing the outermost surfaces of the coating, resulting in a coated product having a uniform covering of the coated material, and which particularly in the case of zinc spelter, imparts a highly attractive luster to the pipes.

The luster and appearance of the galvanized pipe thus obtained is further enhanced by the air cooling and drying thereof, the previously described manner of conveying and treating the pipes affording a sufficient time interval in air out of contact with each other from the time of the exit of the pipes from the bath until received upon conveyor means E for removal and storage. Cooling air may be applied to the pipes as they emerge from the tank, as by a conduit X, blowing air over the pipes during their forward and lateral movement, to solidify and set the coating, thereby obtaining a bright metallic luster and an improved bond for the coating.

Referring more particularly to the illustrated apparatus embodying my invention, the coating tank A mounts and supports the conveyor screws or threaded rolls 3 to 7 inclusive, by means of a superstructure, including a framework or series of beams 9 carried by a flange 10 on the tank through suitable alignment blocks or supports 11. Each of the rolls 4, 5 and 6 is disposed transversely of the tank A and each has an individual depending support or housing carried by the framework 9, said supports being designated by the reference characters of their respective rolls with the added exponent $a$. Rolls 3 and 7 are preferably disposed in the same transverse vertical plane, and may therefore be mounted in a common depending support 3a. All of said supports or housings are provided with suitable bearings for the rolls, and each roll neck or shaft carries a worm gear designated by the exponent $b$ for driving said rolls.

Mounted in suitable bearings are vertical drive shafts designated by the exponent $c$, the shaft for rolls 3 and 7 being designated 3c, said shafts having worms designated by the exponent $d$ for driving the rolls through their respective worm gears. The drives for each of said rolls are disposed and arranged to be synchronously driven from a common source F as follows.

Said source F drives a transverse shaft 12 carried in suitable bearings on the superstructure 9, said shaft driving a line shaft 13 through bevel gears 14. Line shaft 13 extends along one side of the framework 9, and drives roll 4 through bevel gears 15, a transverse shaft 16, a vertical shaft 4c, and bevel gears 4e. Similarly, the roll 6 is driven through bevel gears 17, transverse shaft 18 and shaft 6c through gears 6e. Roll 5 is driven directly by shafts 13 and 5c through provided bevel gears 5e.

The rolls 3 and 7 are driven from shaft 12 through bevel gears 3e driving the common vertical shaft 3c of the worm drive of said rolls. Shaft 12 may also be provided with a sprocket 19 for driving the rolls 2 of the charging table B through a chain drive 20, and a similar sprocket 21 on shaft 18 may be employed to drive the rolls 8 of delivery table C.

Hence, all of said rolls 2 to 8, inclusive, may be driven at uniform speed from the power source F, and by proper correlation of the threads or screws of said rolls, all are driven in synchronism to provide for parallel advancement of the pipes $a$ with the desired combined forward and lateral movement into, through and out of the tank A.

Also, the respective depending supports 3a, 4a, 5a, etc. for the conveyor rolls, together with the lateral dimension or length of said rolls, are proportioned to define and permit a downwardly forwardly inclined travel of the pipes $a$ into the tank A, as by rolls 2, 3, 4 and 5, permitting pivotal motion of the pipes while the same are supported midway of their lengths upon roll 5, to reversely incline said pipes, and to remove the pipes upwardly and outwardly by rolls 5, 7 and 6, as hereinbefore described.

As each pipe is advanced over the inner end of roll 3, at the position indicated by the pipe $a'$ of Figs. 1 and 2, means are provided for submerging the rear portion of said pipe and to reversely incline the pipe to the position indicated at $a''$ in Figs. 2 and 4. Said means comprises a sinker device including a plunger 23 having its lower free terminal carrying a foot 24 for engaging the pipe.

The upper end of the plunger 23 is provided with a roller 25 engaging the circuitous track of a stationary cam 26. A counterweighted link 27 is pivotally connected with the plunger, intermediate its length, the link 27 having pivotal connection with a rotating crank 28 through an intervening link 29, and being provided at its free terminal outwardly beyond said crank with a counterweight 30. The power for driving said crank is derived from shaft 12 through a reduction gear indicated at 31.

Hence, the plunger 23 is moved up and down in properly timed relation, the cam 26 guiding the upper end of the plunger, whereby its lower end moves downwardly to engage and depress the rear free portion of pipe $a'$, upon the delivery thereof from roll 3, into engagement with roll 7 in the manner indicated in Figs. 7 and 8, and then said lower portion of the plunger is moved upwardly and swung laterally to one side away from the path of its downward movement and into elevated position.

The foot 24 is pivoted to the lower end of the plunger 23 and has an adjusting rod 32 adjustably attached at 33 to a portion of the plunger, whereby the inclination of the foot 24 may be conformed to substantially the desired inclination of the submerged pipe $a''$.

In order to guide the downward movement of the pipe under the action of the sinker device, I provide a fixed vertical guide 34 depending centrally below the roll 3, having an edge thereof immediately beneath the terminal of said roll. A second vertical guide 35 depends from the superstructure 9 and is spaced from the guide 34 to provide a passage for the downward travel of the pipe therebetween.

For the purpose of preventing upward floating movement of the pipe after being submerged by the sinker device, I provide a latch 36 pivoted to the guide 35, said latch having a lateral terminal 37 adapted to swing over and prevent upward movement of the pipe as the same is delivered to the roll 7 by the sinker device, said terminal 37 extending transversely across the passage between guides 34 and 35 in locking position.

Latch 36 is in the form of a bell crank and is powered by a vertical rod 38 connected midway of a lever 39 having one end pivoted at 40 and having its free terminal riding upon and actuated by a cam 41, the said cam being driven from reduction gear 31, as shown. The cam drive is so timed in relation to the action of the sinker device as to momentarily move said latch 36 into locking position upon completion of the downward movement of said sinker device.

To further insure the maintained submergence of the pipe, the guide 35 is provided with a horizontal retainer foot 42 extending along and above the roll 7 and the pipes supported thereby until the latter leave the roll. Guide 35 is adjustably mounted at 43 on the framework 9 in order to properly locate said guide in relation to the roll 7.

At the region of emergence of the pipes a from the surface of the molten spelter, I provide means in the form of a paddle roll 44 extending transversely of the tank A, said roll being driven in a direction to effect a flow of the upper stratum of the spelter away from the pipe. Hence, any oxide or scum formation on the surface of the spelter will be prevented from engaging the pipe upon its emergence from the bath.

The paddle roll 44 is suspended in the tank from the framework 9 by hangers 45, and is driven from shaft 18 by gears 46 and chain drive 47, the latter driving the roll through bevel gears 48 and vertical shaft 49. Said device 44 is disposed substantially at the surface of the spelter in order to obtain the desired action upon the oxide and foreign matter floating upon said surface.

It will be seen that the mountings or supports for the various conveyor rolls, the sinker device, the latch, and the paddle roll and the drives therefor, are all suspended from or mounted on the superstructure or framework 9, whereby the entire assembly may be removed for repair or replacement of parts, and for cleaning or repairing the tank A. Further, the various parts of the equipment may be located and secured to the framework as a unit in the shop prior to application to the tank, thus providing for convenient, accurate and efficient construction.

The various conveyor rolls may be selected of a diameter and having a thread size to accommodate several pipe sizes without change. For example, one set of conveyor rolls may be conveniently designed to accommodate one-half, three-fourths and one inch pipe, a second set for one and one-fourth, one and one-half and two inch pipe, and so on, making it possible to economically produce several pipe sizes without changing rolls.

While the present apparatus may be readily employed for small and large pipe sizes alike by varying the equipment in proportion thereto, the same is particularly desirable for the smaller sizes aforementioned, due to the greater demand for such sizes and the ability and capacity of the method and apparatus to produce large quantities of such sizes to meet that demand. In comparison with the former batch and wiping processes, I am enabled to produce galvanized pipe in the smaller sizes up to 180 to 190 tons per eight-hour run, whereas the batch process rarely exceeds 110 tons and the wiping process 50 tons for a like period. The saving in cost of production in such a comparison is readily apparent.

The successful practice of my invention has shown that the bath of spelter may be satisfactorily operated at reduced temperature, i. e., from about 840° F. to 860° F., producing a considerable saving in spelter due to the reduction in wasteful oxide and dross formation. In addition, the reduced temperature and the increased time of immersion of the pipes by reason of their manner of travel through the tank, produces a greatly improved and uniform coating, both inside and outside the pipes.

The continuous rotation of the pipes by the roll threads upon their emergence from the bath automatically avoids excess spelter being carried out of the bath therewith and produces a uniform coating of excellent character and appearance. Further, the reduced speed of travel permits the pipes to be adequately air dried without the necessity of steam or other wipes, so that their coatings are set and hard before said pipes come in contact after leaving the delivery table.

However, it will be noted that air, steam or pressure wipes may be used if it is desired to produce minimum coatings, as is the case with certain types of light galvanized pipe. In such practice, the uniform character of the coating of the present invention is not affected and the resulting product and advantages of the present method are obtained.

Various changes and modifications are contemplated within the scope of the following claims.

I claim:

1. In apparatus of the character described, conveyor means for conveying pipe and the like in relation to a coating tank, including a series of threaded conveyor rolls disposed transversely of the direction of longitudinal advance of the pipes, said rolls being disposed in a plane inclined downwardly toward said tank, a second series of threaded conveyor rolls disposed transversely of the longitudinal advance of the pipes and in a plane inclined upwardly away from the tank, means for driving all of said rolls at constant speed, the threads of said rolls being aligned to receive and support the pipes in parallel relation and impart simultaneous forward and lateral movement thereto, said second series of rolls extending laterally at one side and beyond the first series of rolls, and means operable as the pipes move laterally beyond the first series of rolls for reversing the inclination of the pipes and engaging the same upon the second series of rolls.

2. The combination with a galvanizing tank, of means for conveying pipes and the like longitudinally downward endwise into the tank, means for conveying said pipes out of the tank endwise at a reverse inclination, means for reversing the inclination of the pipes in the tank and for engaging the pipes with the second conveying means, and means for driving the conveying and pipe reversing means to effect a continuous travel of the pipes into, through and out of said tank.

3. The combination with a galvanizing tank, of a plurality of conveyors for supporting and conveying pipes and the like longitudinally at a downward forward inclination into the tank while moving the pipes transversely of their said forward travel, means for pivotally supporting the forward end portions of the pipes in the tank as the rear end portions thereof travel laterally beyond their supporting conveyors, a sinker means operable to engage and submerge the free rear portions of the pipes by pivotal movement of the pipes about said support, a plurality of conveyors for supporting and conveying the submerged pipes from the tank, and means for driving the conveyors to effect continuous travel of the pipes into, through and out of the tank.

4. The combination with a galvanizing tank, of a plurality of threaded conveyor rolls disposed transversely in a downwardly inclined plane adapted to receive and convey pipes and the like endwise downwardly into and transversely of the tank, the lowermost of said conveyor rolls extending transversely beyond the other rolls in the direction of transverse travel of the pipes, a sinker means for engaging and submerging rear portions of the pipes as the same move transversely beyond said other rolls by pivotal movement of the pipes by the sinker means about said lowermost roll, and threaded conveyor roll means extending transversely of the tank on either side of the lowermost roll and in an upwardly inclined plane for receiving and conveying the submerged pipes upwardly endwise from the tank.

5. The combination with a galvanizing tank, of a plurality of threaded conveyor rolls disposed transversely in a downwardly inclined plane adapted to receive and convey pipes and the like endwise downwardly into and transversely of the tank, the lowermost of said conveyor rolls extending transversely beyond the other rolls in the direction of transverse travel of the pipes, a sinker means for engaging and submerging the rear portions of the pipes as the same move transversely beyond said other rolls by pivotal movement of the pipes by the sinker means about said lowermost roll, means limiting the downward movement of the pipes by the sinker means, and threaded conveyor rolls extending transversely of the tank and in an upwardly inclined plane for receiving and conveying the submerged pipes upwardly endwise from the tank.

6. In a galvanizing tank, a pair of threaded conveyor rolls disposed in a plane inclined downwardly into the tank for conveying pipes and the like at a forward and downward inclination within the tank, said rolls being disposed transversely of the forward travel of the pipes and being operable by their threads to advance the pipes longitudinally and transversely, the first roll terminating short of the width of the tank, a sinker means operable to engage and submerge the rear portions of the pipes as the latter pass transversely beyond the first roll by pivotal movement of the pipes about the second roll, a third threaded conveyor roll below the first roll, means for guiding the rear portions of the pipes in their downward travel into engagement with the third roll, and a fourth threaded conveyor roll receiving and supporting the forward ends of the pipes, the second, third and fourth rolls being disposed transversely in an upwardly and forwardly inclined plane for conveying the pipes from the tank.

7. In a galvanizing tank, a pair of threaded conveyor rolls disposed in a plane inclined downwardly into the tank for conveying pipes and the like at a forward and downward inclination within the tank, said rolls being disposed transversely of the forward travel of the pipes and being operable by their threads to advance the pipes longitudinally and transversely, the first roll terminating short of the width of the tank, a sinker means operable to engage and submerge the rear portions of the pipes as the latter pass transversely beyond the first roll by pivotal movement of the pipes about the second roll, a third threaded conveyor roll below the first roll, means for guiding the rear portions of the pipes in their downward travel into engagement with the third roll, a fourth threaded conveyor roll receiving and supporting the forward ends of the pipes, means adjacent the third roll for preventing upward floating travel of the rear end portions of the pipes upon the delivery thereof to said roll, the second, third and fourth rolls being disposed transversely in an upwardly and forwardly inclined plane for conveying the pipes from the tank.

8. In apparatus of the character described, the combination with a galvanizing tank, of a series of conveyor rolls disposed transversely in a plane inclined downwardly into the tank, of a second series of conveyor rolls disposed transversely in an intersecting plane inclined upwardly from the tank, said plural series of rolls having a common roll adjacent the intersection of said planes, all of said rolls having threaded surfaces for receiving pipes and the like, the threads thereof being aligned to support and convey the pipes in parallel spaced relation with a combined endwise forward and sideward lateral movement, the rolls of said first series terminating short of the total lateral travel of the pipes, and means for reversing the inclination of the pipes upon the travel of the same laterally beyond the first rolls by pivotal movement of the pipes about the common roll, thereby delivering the reversely inclined pipes upon the second series of rolls to remove said pipes from the tank.

9. In apparatus of the character described, the combination with a galvanizing tank, of a series of conveyor rolls disposed transversely in a plane inclined downwardly into the tank, of a second series of conveyor rolls disposed transversely in an intersecting plane inclined upwardly from the tank, said plural series of rolls having a common roll adjacent the intersection of said planes, all of said rolls having threaded surfaces for receiving pipes and the like, the threads thereof being aligned to support and convey the pipes in parallel spaced relation with a combined endwise forward and sideward lateral movement, a sinker means disposed to engage the rear portions of the pipes delivered laterally by said first series of rolls and adapted to pivotally submerge said pipes about the common roll into engagement with a roll of the second series, and a latch to prevent upward floating travel of the submerged pipes upon the retraction of the sinker means.

10. In apparatus of the character described, the combination with a galvanizing tank, of a series of conveyor rolls for conveying a plurality of pipes and the like in longitudinally parallel relation downwardly endwise and simultaneously transversely with respect to the tank, a sinker means for individually reversing the inclination of the pipes delivered from said rolls, and a second series of conveyor rolls positioned to receive the reversely inclined pipes, said second series of rolls being disposed in an upwardly inclined plane and being operable to convey the pipes longitudinally upward and transversely from the tank.

11. In apparatus of the character described, the combination with a coating tank, of a series of horizontal threaded conveyor rolls disposed transversely in a plane inclined downwardly into the tank to convey the pipes longitudinally downward into and laterally of the tank, means for conveying the pipes upwardly out of the tank, means for reversing the inclination of the pipes in said tank and for engaging the pipes with the second conveying means, and means for driving the rolls, conveying and pipe reversing means to effect a continuous travel of the pipes into, through and out of said tank.

PAUL C. ELY.